(12) United States Patent
Al-Wasis

(10) Patent No.: US 9,301,442 B1
(45) Date of Patent: Apr. 5, 2016

(54) IRRIGATION SYSTEM

(71) Applicant: Adel Abdulmuhsen Al-Wasis, Sabahiya (KW)

(72) Inventor: Adel Abdulmuhsen Al-Wasis, Sabahiya (KW)

(*) Notice: Subject to any disclaimer, the term of this patent is extended or adjusted under 35 U.S.C. 154(b) by 0 days.

(21) Appl. No.: 14/842,739

(22) Filed: Sep. 1, 2015

(51) Int. Cl.
*C02F 1/14* (2006.01)
*A01G 25/02* (2006.01)
*A01C 23/04* (2006.01)
*F24J 2/34* (2006.01)

(52) U.S. Cl.
CPC .............. *A01C 23/042* (2013.01); *A01G 25/02* (2013.01); *F24J 2/345* (2013.01)

(58) Field of Classification Search
CPC ...... B01D 1/0035; C02F 1/14; A01C 23/042; A01G 25/02; F24J 2/345
USPC ............. 239/310, 379, 37–38, 200, 201, 202, 239/207, 135, 136; 202/176
See application file for complete search history.

(56) References Cited

U.S. PATENT DOCUMENTS

| | | | | |
|---|---|---|---|---|
| 2,606,068 A * | 8/1952 | Bonacor | ............... | A01C 23/042 137/376 |
| 2,608,068 A * | 8/1952 | Rydin | ................... | A47F 3/0443 312/126 |
| 2,709,623 A * | 5/1955 | Glynn | .................. | B05B 1/3033 239/201 |
| 2,975,107 A | 3/1961 | Friedman | | |
| 4,154,657 A * | 5/1979 | Dennen | ................ | B01D 5/0066 159/15 |
| 4,267,022 A * | 5/1981 | Pitcher | ..................... | C02F 1/16 202/185.3 |
| 4,317,539 A * | 3/1982 | Pollock | .................. | A01G 25/02 137/236.1 |
| 5,198,076 A * | 3/1993 | Borgren | .................. | B01D 3/10 159/901 |
| 5,441,606 A * | 8/1995 | Schlesinger | ......... | B01D 1/0017 202/176 |
| 5,538,598 A * | 7/1996 | Schlesinger | ......... | B01D 1/0017 202/197 |
| 6,936,140 B2 * | 8/2005 | Paxton | ...................... | C02F 1/04 159/2.1 |
| 8,246,786 B2 * | 8/2012 | Cap | ....................... | B01D 1/0035 159/903 |
| 8,297,536 B2 * | 10/2012 | Ruda | ..................... | B05B 7/2478 215/306 |
| 8,321,061 B2 | 11/2012 | Anderson | | |
| 8,746,593 B2 * | 6/2014 | Smith, III | ................. | B05B 7/32 222/490 |
| 2006/0123699 A1 * | 6/2006 | Lo Presti | ............... | A01G 9/246 47/17 |
| 2007/0090202 A1 * | 4/2007 | Hsia | ...................... | B01D 5/0066 239/128 |
| 2007/0145162 A1 * | 6/2007 | Macmahon | .......... | A01C 23/042 239/462 |
| 2007/0290067 A1 * | 12/2007 | Espinoza | ............... | A01G 25/16 239/69 |
| 2010/0163557 A1 * | 7/2010 | Bartlett | ................ | B65D 90/046 220/62.21 |
| 2015/0156975 A1 * | 6/2015 | Gould | ....................... | F16L 9/14 239/565 |

FOREIGN PATENT DOCUMENTS

| | | |
|---|---|---|
| FR | 2707281 | 1/1995 |
| GB | 2487540 | 8/2012 |

OTHER PUBLICATIONS

Unkown, Ez FLo Fertilization System, Apr. 11, 2007, -,-, pp. 1-4.*

\* cited by examiner

*Primary Examiner* — Arthur O Hall
*Assistant Examiner* — Joseph A Greenlund
(74) *Attorney, Agent, or Firm* — Richard C. Litman

(57) ABSTRACT

The irrigation system provides for the purification of water from a source of impure water, and for the distribution of the purified water to crops for agricultural irrigation purposes. The system includes a specially configured tank, the tank being partially evacuated to lower the pressure therein to vaporize or boil the water in the tank under vacuum. Heat energy may be provided to the tank by solar reflectors or other heat source. The purified water vapor passes from the tank and through a heat exchanger. The cooled vapor flows through a distribution network and out through a plurality of specially configured moisture distribution heads to flow into the soil. The distribution heads may also distribute liquid fertilizer to the soil.

5 Claims, 3 Drawing Sheets ns within the tank 12 sufficiently that the water within the tank 12 will boil at a temperature below the ambient temperature of the surrounding environment.

IRRIGATION SYSTEM

BACKGROUND OF THE INVENTION

1. Field of the Invention

The present invention relates generally to irrigation systems, and particularly to an irrigation system for arid regions wherein well water, which may have a high salt content, is vaporized in a tank at relatively low pressures and temperatures for transmittal through a distribution network to a plurality of distribution heads for watering plants.

2. Description of the Related Art

A large number of irrigation systems have been developed in the past. Their basic principles of operation are greatly dependent upon the local conditions where they are installed. Many areas of the world use a system of open canals to provide water to fields and orchards, so that the water flows naturally downslope with no requirement for pumps. Other areas use water pumped from subterranean wells or other water sources, and distribute the water through a system of closed pipes, sprinklers, and/or other distribution means.

As agricultural needs require relatively pure and uncontaminated water, the above-described systems work well when sufficient quantities of clean water are available. However, in many areas of the world there is insufficient clean water for agricultural use, and water must be purified at least to some extent for agricultural use. For example, in many areas of the Middle East, water for agricultural purposes is drawn from seawater or underground water sources containing brackish water. This water must be purified to at least some extent before it is suitable for agricultural use.

Thus, a distillation and irrigation system solving the aforementioned problems is desired.

SUMMARY OF THE INVENTION

The irrigation system includes a specially configured water tank that is supplied with impure water from an external source (well, seawater, etc.). A vacuum pump draws air from the tank, thus lowering the pressure within the tank to reduce the vapor pressure, and thus the temperature, required for the vaporization of the water within the tank. Heat energy is provided to the tank by a plurality of solar reflectors aimed at the tank. Other heat sources may be provided as desired.

The purified water vapor passes from the tank into a distribution network of pipes. A subterranean heat exchanger cools the vapor shortly after it leaves the tank. The cooled vapor continues through the distribution network to a plurality of specially configured moisture distribution heads to be distributed into the soil. Liquid fertilizer may also be supplied to the moisture distribution heads to flow into the soil along with the purified water.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The irrigation system may receive impure water from a source thereof, purifies that water, and distributes the water for agricultural irrigation of plants, crops, orchards, gardens, etc. The system requires little external power according to the embodiment described herein, requiring electrical power only for a water supply pump and for a vacuum pump.

Figure 1:
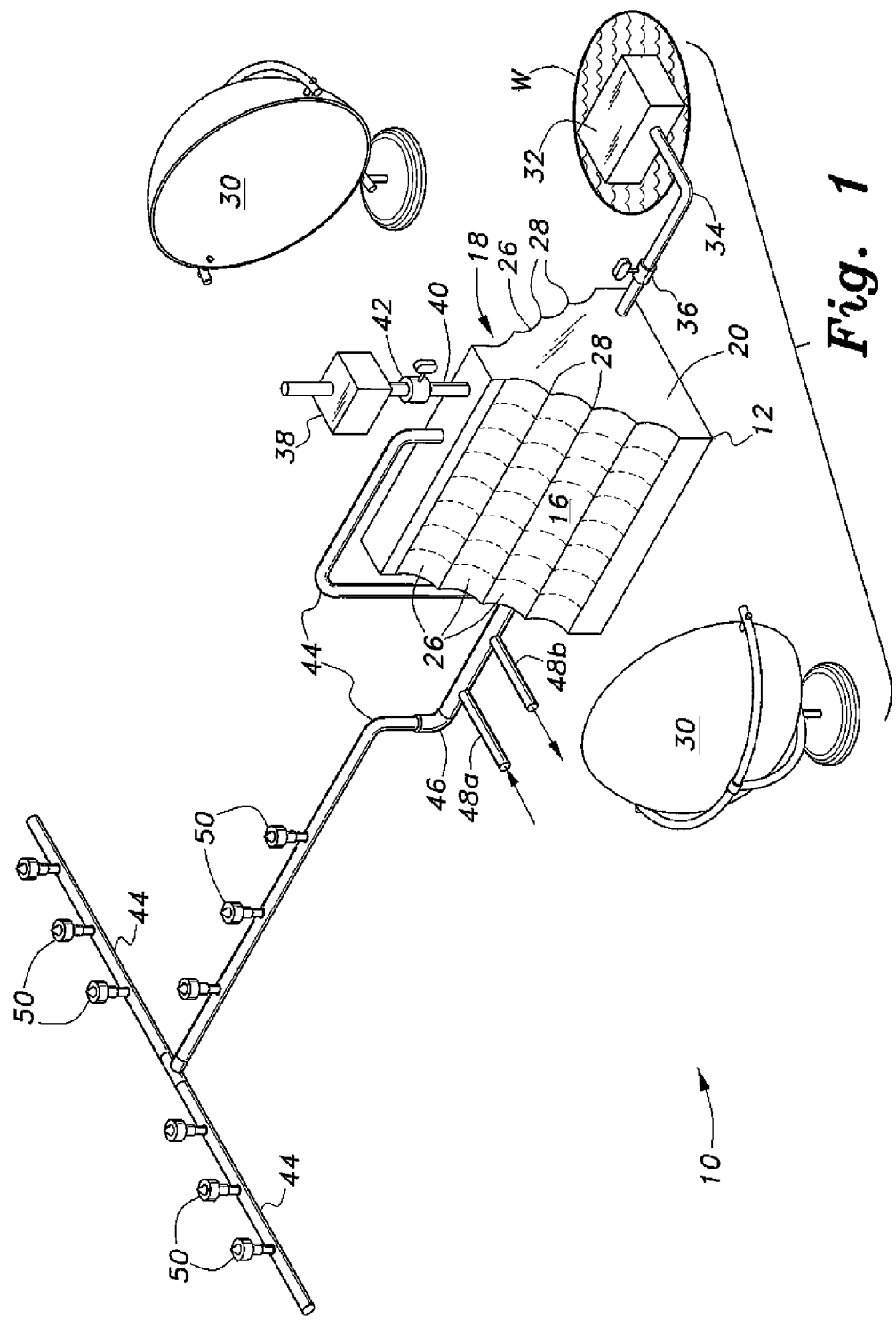
FIG. 1 is a perspective view, largely diagrammatic, of an irrigation system according to the present invention, illustrating its basic components.
Figure 2:
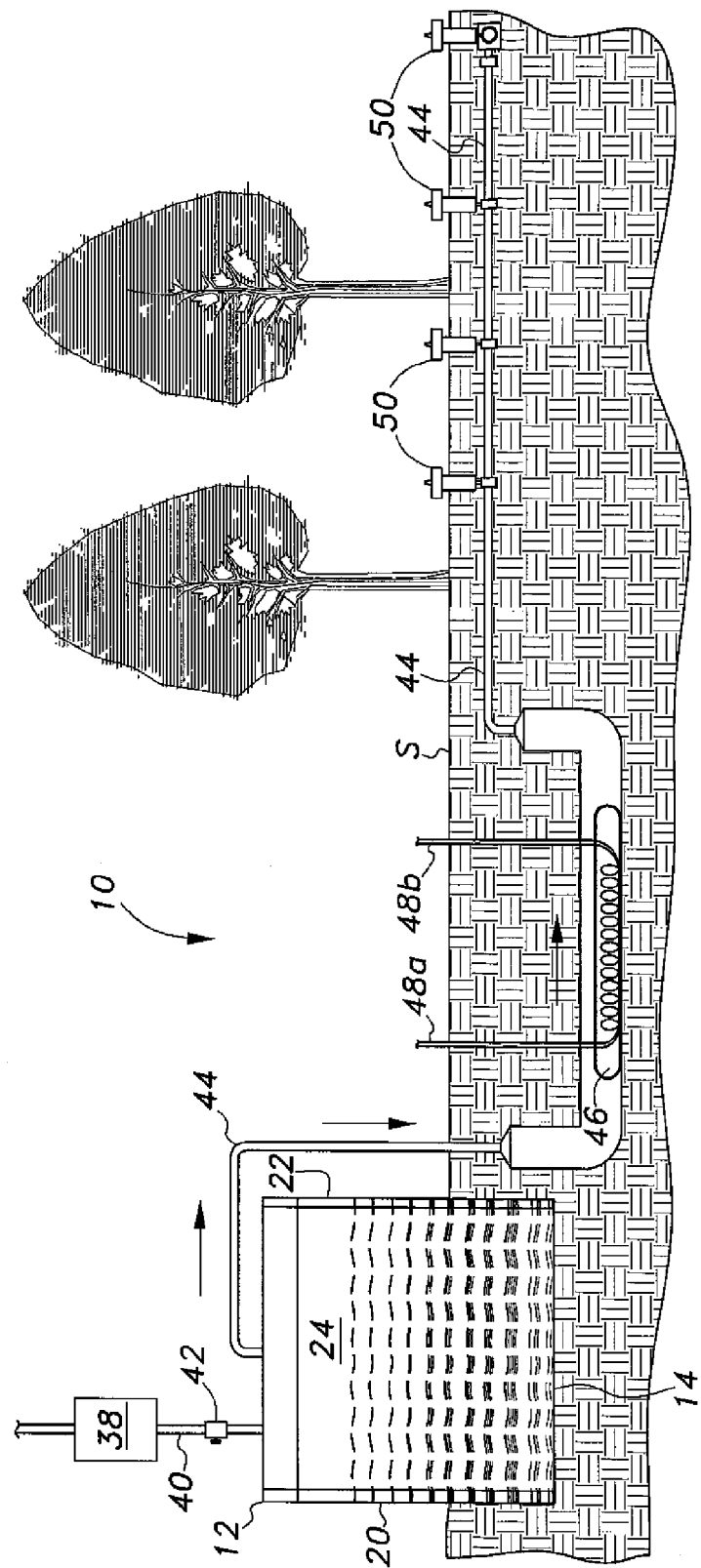
FIG. 2 is an environmental elevation view in section of the irrigation system of FIG. 1, showing an exemplary installation where water is distributed above ground level.

FIGS. 1 and 2 provide perspective and environmental elevation views, respectively, of the irrigation system (or system) 10. The heart of the system 10 is a water tank 12 that is partially evacuated during operation of the system to lower the pressure therein. The pressure within the tank 12 will lower until the vapor pressure of water in the tank 12 at the temperature inside the tank 12 is reached, so that the water boils. The tank 12 includes a base 14 (shown in the elevation view of FIG. 2), a first side 16, and a second side 18, with the base and two sides defining a generally triangular configuration. The tank 12 further has two ends 20 and 22 (end 22 being shown in FIG. 2) to enclose the internal volume 24 of the tank 12.

The two sides 16 and 18 of the tank 12 preferably include a plurality of horizontally disposed concave scallops 26 therein, which are separated by horizontal ridges or ribs 28. This alternating scallop 26 and ridge 28 configuration adds stiffness to the two sides 16 and 18 of the tank 12 to resist inward buckling due to the lower pressure within the tank 12, and also provides greater surface area for receiving and absorbing heat from an external source.

The heating system for the tank 12 preferably comprises a plurality of solar reflectors 30, including one such reflector 30 disposed to each side 16 and 18 of the tank 12 and oriented to direct sunlight onto the respective side. Other heat sources or systems, e.g., electric, combustion, etc., may be used alternatively, but the solar reflector system is preferred due to its passive nature, requiring no electrical energy or other power for its operation.

Water is supplied to the tank 12 from an external water source W, e.g., a well, as shown in FIG. 1, or seawater or other source. The irrigation system 10 can accept impure water, e.g., brackish water or water containing other contaminants, as the water is distilled under vacuum within the tank 12 before it is conveyed for irrigation purposes. Thus, a well supplying water for the system 10 need not provide potable water. Any well (or other water source) that has been abandoned due to impurities or contamination of the water may be used to supply the water required for the operation of the system 10. A pump 32 communicates fluidly with the water source W to draw water therefrom, and transmits the water to the tank 12 via a water supply line 34 extending from the water pump 32 to the tank 12. A first check valve 36 is installed in the water supply line 34 between the pump 32 and the tank 12 to prevent backflow from the tank 12 to the pump 32 and water source W. The above-described water supply system is not shown in FIG. 2, in order to more clearly show other components of the system in that drawing.

Air is evacuated from the tank 12 by a vacuum pump 38 that communicates pneumatically with the tank 12, either directly or via an air evacuation pipe or line 40. A second check valve 42 is installed in the air evacuation pipe or line 40 between the tank 12 and the vacuum pump 38 to preclude backflow of air into the tank 12 during operation. The tank 12 need not be completely evacuated. It is only necessary to lower the pressure within the tank 12 to a level equal to or slightly below the vapor pressure of the water within the tank. This vapor pressure will vary depending upon the temperature of the water in the tank 12, higher water temperatures resulting in higher vapor pressures. Thus, the pressure within the tank 12 may be somewhat higher than absolute zero or vacuum, accordingly.

As an example of the above, if the heat sources 30 are capable of heating the water within the tank 12 to a temperature of about 80° Celsius, the vapor pressure of the water therein will be about 46.7 percent of ambient atmospheric pressure at sea level, or about 6.87 pounds per square inch or 473.7 millibars. Thus, the tank 12 need not be completely evacuated, and the differential pressure between the internal volume 24 of the tank 12 and ambient external pressure is correspondingly reduced. This allows the tank 12 to be constructed less rigidly than would be the case if a pressure differential of one atmosphere were required, and the vacuum pump 38 may be a less expensive and less efficient model than might be required otherwise.

It will be seen that the above figures are only exemplary, and that the heat achieved within the tank 12 will be dependent upon the ambient external temperature and the amount of sunlight directed onto the tank sides 16 and 18, where solar heating is used. In some extreme conditions, it may be possible to heat the water within the tank 12 to a temperature of or closely approaching 100° Celsius, in which case the vapor pressure of the water within the tank 12 will be equal to ambient external pressure and no evacuation of the tank 12 will be required.

The distilled water vapor resulting from the above operation passes into a moisture distribution network 44 that extends from the tank 12 to extend beneath the surface S to the crops to be irrigated, as shown in FIG. 2. A subterranean heat exchanger 46 may be provided in the trunk portion of the network 44 between the tank 12 and the moisture distribution heads of the system (described in detail further below). The heat exchanger 46 may comprise a larger diameter section of pipe or tube to provide for expansion and cooling of the water vapor. Heat exchange inlet and outlet pipes or tubes 48a, 48b, deliver coolant to a coil disposed within the heat exchanger. The coolant may be liquid or gaseous, so long as it is cooler than the vapor passing through the heat exchanger 46 body.

The moisture distribution network 44 includes a plurality of moisture distribution heads 50 disposed along its distal portions, where the crops needing irrigation are planted. The cooled water or moisture, in whatever state, passes through the moisture distribution network 44 to exit the system through the various moisture distribution heads 50, thereby flowing into the soil to be absorbed by the roots of the crops. Means may be provided in the system to produce a positive pressure head between the tank 12 and the moisture distribution heads 50, to cause the moisture to flow from the tank 12 to and out through the moisture distribution heads 50.

Figure 3:
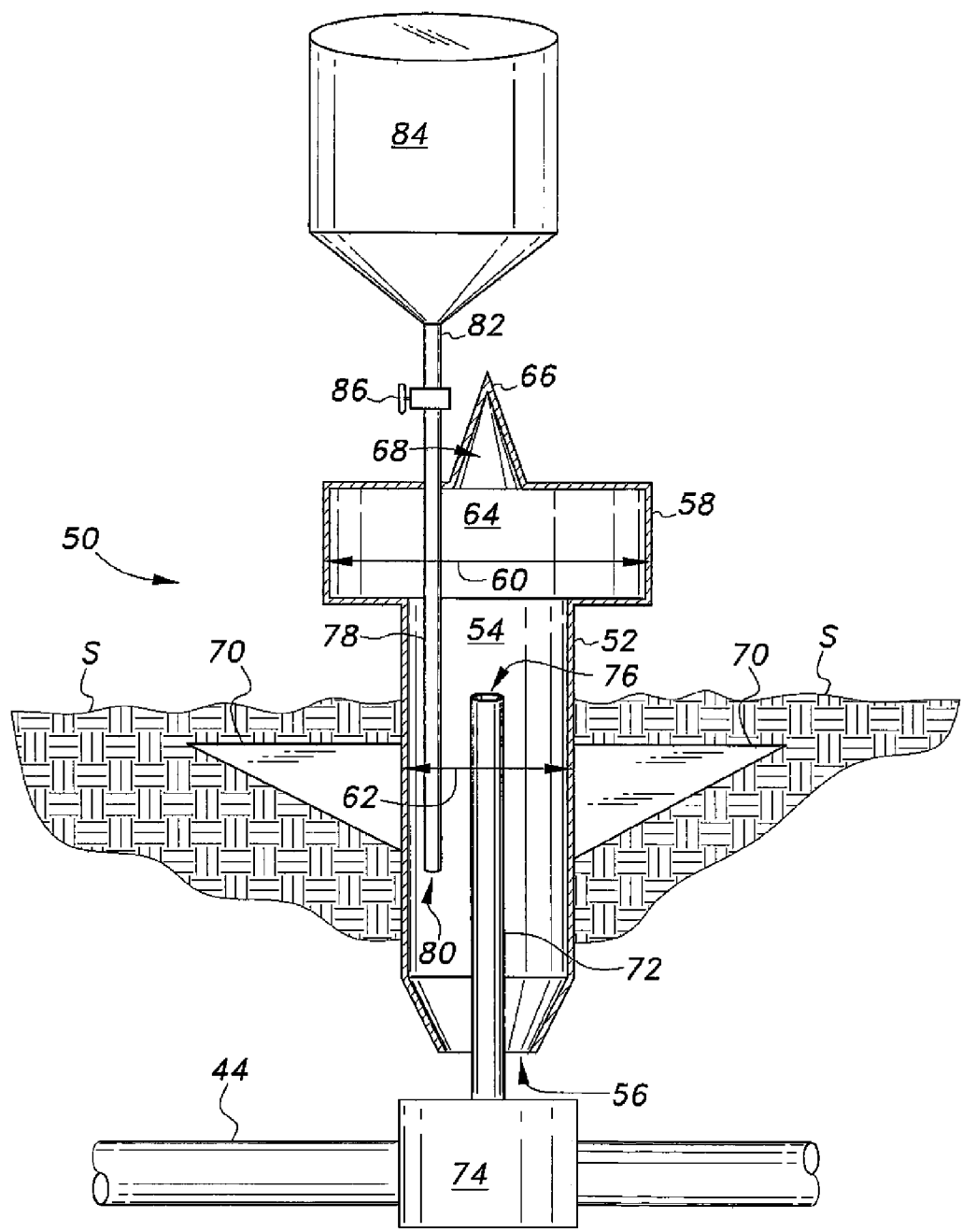
FIG. 3 is an elevation view in section of a single moisture distribution head of the irrigation system of FIG. 1.

FIG. 3 provides a detailed elevation view in section of an exemplary moisture distribution head (or head) 50. The head 50 includes a vertically oriented, hollow, generally cylindrical body 52 having an interior volume 54 and an open lower end 56. A hollow cap 58 having a diameter 60 greater than the diameter 62 of the body 52 extends concentrically across the top of the body. The interior volume 64 of the cap 58 communicates with the interior volume 54 of the body 52. A hollow, conical apex 66 extends upward from the top of the cap 58. The apex 66 has an interior volume 68 that communicates with the interior volume 64 of the cap 58, and thus with the interior volume 54 of the body 52. Diametrically opposed anchor plates or wings 70 extend outward from the sides of the body 52 for anchoring the moisture distribution head 50 in the soil. It will be seen that most of the body 52 of the head 50 and its open lower end 56 are disposed in the soil beneath the surface S. Although the caps 58 of the heads 50 are shown above ground level in FIG. 2, it will be understood that the entire distribution head 50 may be disposed below ground level with the caps 58 at the level of the plant's root system to dispense water directly at the roots, if desired.

The moisture distribution heads 50 are installed along the moisture distribution network 44. The heads 50 are installed over corresponding moisture distribution tubes 72 extending upward from fittings 74 installed along the network 44. Each of the tubes 72 extends upward inside the hollow body 52 of a corresponding one of the moisture distribution heads 50. Each tube has an open upper end 76 disposed within the body 52 of its moisture distribution head 50. Vapor travels through the moisture distribution network 44, up the tube 72 and out of its open upper end 76, and into the hollow body 52 of the moisture distribution head 50. The moisture then passes out of the open lower end 56 of the moisture distribution head 50 to flow into the surrounding soil.

The moisture distribution heads 50 may be used to distribute a liquid fertilizer into the soil, as well. The moisture distribution head 50 of FIG. 3 includes a liquid fertilizer dispensing tube 78 that extends downward through the cap 58 and into the body 52. The fertilizer tube 78 has an open lower end 80 that communicates with the hollow interior 54 of the body 52, and an opposite distal upper end 82 disposed externally to the head 50. A fertilizer dispensing tank or container 84 communicates with the distal upper end 82 of the fertilizer tube 78. A control valve 86 is disposed along the tube 78 between its upper end 82 and the moisture distribution head 50.

It is to be understood that the present invention is not limited to the embodiments described above, but encompasses any and all embodiments within the scope of the following claims.

I claim:
1. An irrigation system, consisting of comprising:
a water tank having a base and first and second sides, the base and first and second sides defining a generally triangular configuration, each of the first and second sides having a plurality of horizontally disposed concave scallops therein;
a water source communicating with the tank;
a solar heating system providing heat to the tank;
a vacuum pump communicating with the tank for partially evacuating air from the tank, wherein the evacuation is sufficient to lower the pressure within the tank to a level approximately equal to the vapor pressure of the water within the tank thereby creating a distilled water vapor:
a moisture distribution network extending from the tank;
a plurality of moisture distribution heads disposed along the moisture distribution network, the heads being adapted for dispensing water distilled in the tank under vacuum to plants;
a subterranean heat exchanger disposed along the moisture distribution network between the tank and the moisture distribution heads, wherein the distilled water vapor is in direct communication with the heat exchanger;
a liquid fertilizer tube extending into at least one of the moisture distribution heads, the tube having a distal end disposed external to the moisture distribution head and an open end disposed within the moisture distribution, head; and
a liquid fertilizer supply communicating with the distal end of the liquid fertilizer tube.

2. The irrigation system according to claim 1, wherein each of the moisture distribution heads comprises:
- a vertically oriented, hollow, generally cylindrical body having an interior volume and an open lower end;
- a hollow cap disposed atop the body, the cap having a larger diameter than the body and an interior volume, the interior volume of the cap communicating with the interior volume of the body;
- a hollow apex disposed atop the cap, the apex having an interior volume, the interior volume of the apex communicating with the interior volume of the cap; and
- a moisture distribution tube extending upward from the moisture distribution network into the hollow body.

3. The irrigation system according to claim 1, wherein the solar heating system comprises a plurality of solar reflectors.

4. The irrigation system according to claim 1, wherein the water source comprises:
- a well;
- a water pump communicating fluidly with the well; and
- a water supply line extending from the water pump to the tank.

5. The irrigation system according to claim 4, further comprising:
- a first check valve disposed in the water supply line; and
- a second check valve disposed between the tank and the vacuum pump.

* * * * *